United States Patent [19]
Ross et al.

[11] Patent Number: 6,070,414
[45] Date of Patent: Jun. 6, 2000

[54] CRYOGENIC COOLER WITH MECHANICALLY-FLEXIBLE THERMAL INTERFACE

[75] Inventors: Bradley A. Ross; Robert M. Thompson, Jr., both of Tucson, Ariz.

[73] Assignee: Raytheon Company, Lexington, Mass.

[21] Appl. No.: 09/054,892

[22] Filed: Apr. 3, 1998

[51] Int. Cl.⁷ .............................. F25B 19/00; F25B 9/00; F25D 19/00; G01J 5/02
[52] U.S. Cl. .................................. 62/51.1; 62/6; 62/295; 62/383; 250/352
[58] Field of Search .................................. 250/352; 62/6, 62/51.1, 295, 383

[56] References Cited

U.S. PATENT DOCUMENTS

| | | | |
|---|---|---|---|
| 3,851,173 | 11/1974 | Taylor et al. | 250/352 X |
| 4,450,693 | 5/1984 | Green et al. | 62/51.1 |
| 4,501,131 | 2/1985 | Gaskin et al. | 62/383 X |
| 4,727,255 | 2/1988 | Monier et al. | 62/51.1 X |
| 5,542,254 | 8/1996 | Pruitt | 62/51.1 X |

*Primary Examiner*—William Doerrler
*Attorney, Agent, or Firm*—David W. Collins; Andrew J. Rudd; Glenn H. Lenzen, Jr.

[57] ABSTRACT

A cryogenic cooler and a dewar assembly including a cooled surface; a cooling surface for removing thermal energy from said cooled surface; and an adapter disposed between said cooling surface and the cooled surface for conducting thermal energy therebetween. A first fluid is disposed between the cooled surface and the adapter for conducting thermal energy from the cooled surface to the adapter. A second fluid is disposed between the cooling surface and the adapter for conducting thermal energy from the adapter to the cooling surface whereby the cooling surface remains free to move axially relative to the adapter at a temperature of the cooling surface at which the first fluid is susceptible to freezing. This allows for movement of the cold finger relative to the dewar and adapter, due to differential thermal coefficients of expansion or support structure motion, without adversely affecting the communication of thermal energy from the load. In the illustrative embodiment, the cooler is a Stirling cycle cooler, the first fluid is thermal grease and the second fluid is nitrogen. The cooling surface is a cylindrical cold finger of the Stirling cycle cooler and the cooled surface is an inner wall of a dewar assembly. The dewar is in thermal contact with a load. The adapter is disposed between the inner wall of the dewar and the cold finger. The adapter has an end cap and a cylindrical housing extending therefrom. The housing extends at least partially along a longitudinal axis of the cold finger. An insulator is disposed about the cold finger and the adapter housing. A spring is disposed between a proximal end of the insulator and a base of the cold finger to maintain a distal end of the insulator in contact with the adapter and the adapter in contact with the dewar.

18 Claims, 3 Drawing Sheets

CRYOGENIC COOLER WITH MECHANICALLY-FLEXIBLE THERMAL INTERFACE

BACKGROUND OF THE INVENTION

1. Field of the Invention

The present invention relates to systems and apparatus for heat transport. More specifically, the present invention relates to cooling systems and similar apparatus at cryogenic temperatures.

2. Description of the Related Art

Cryogenic coolers lift heat from infrared detectors and associated electronic components in applications where space is limited. The cryogenic cooler is typically inserted into a dewar (or housing) onto which one or more detector elements are mounted. Current missile applications require that an infrared focal plane array of detector elements be cooled to liquid nitrogen temperatures, i.e., 80° K. (−193° C.). Joule-Thomson and Stirling Cycle coolers are the two cooling technologies most often used to provide controlled cooling at such extreme temperatures.

A Joule-Thomson cryostat is a cooling device that uses a valve (known in the art as a "Joule-Thomson valve") through which a high pressure gas is allowed to expand via an irreversible throttling process in which enthalpy is conserved, resulting in lowering of its temperature. The simplest form of a conventional Joule-Thomson cryostat typically used a fixed-size orifice in the heat exchanger at the cold end of the cryostat such that cooling by the cryostat was unregulated. The input pressure and internal gas flow dynamics established the flow parameters of the coolant through the cryostat.

Joule-Thomson cryostats require a supply of highly pressurized gas. In certain applications, such as airborne missiles, this requirement tends to impose significant logistical constraints. In the airborne missile context, for example, only a limited amount of pressurized gas can be carried on the missile and the host vehicle. This limits the 'on-station' life of the weapons platform in proportion to the amount of pressurized gas onboard. After each mission, the gas containers must be recharged. Frequent recharging of Joule-Thomson cryostats increases the possibility of contamination due to small impurities which may block the fine orifice of the device. These constraints impose significant field maintenance requirements which limit the viability of Joule-Thomson cryostats for such demanding applications.

For these and other reasons, Stirling cycle coolers tend to be preferred for such applications. A Stirling cycle cooler is an efficient and compact closed-cycle, electrically-driven cryogenic cooling device. The original Stirling cycle cooler consisted of a compressor piston within a cylinder, an expansion piston (or displacer) within a cylinder, and a drive mechanism. The drive mechanism converted the rotary motion of a motor and crankshaft to a reciprocating motion of the two pistons. The two pistons were arranged to be ninety degrees out-of-phase. A regenerative heat exchanger (regenerator) was included in the expansion piston to thermally isolate gas at the compressor piston head space from gas at the expansion piston head space. The original Stirling cycle cooler in which the compressor piston and expander piston are mechanically linked is known as the Integral Stirling Cooler. When operated between two temperature sinks, the Stirling cycle mechanism can either produce shaft power when heat is supplied to the expansion space (Stirling engine) or pump heat from a low temperature to a high temperature, and thereby provide refrigeration, when mechanical power is provided to the drive mechanism (Stirling cooler).

The Split-Stirling cycle cooler included all of the components of the integral Stirling cycle cooler, without mechanical linkage to the expander piston. This permitted the expander to be located remote from the compressor. The expander piston in this device was no longer driven by a connecting rod and crankshaft, but rather pneumatically by means of an additional drive piston. The drive piston was attached to the warm end of the expander piston and protruded into a small cavity at the extreme end of the expander housing. This created a "spring volume" as the gas acted as a spring on the drive piston.

The piston was sealed so that gas could not readily enter the spring volume from the expander side. The drive piston was pneumatically reciprocated by cyclic gas pressure changes produced by the compressor piston driven by the compressor crankshaft or linear electric motor. The gas thus supplied to and withdrawn from the expander traveled through a supply tube commonly referred to as a transfer line. The two subassemblies were thus often interconnected with a sufficiently small diameter gas transfer line to effectively decouple vibration and motion of the expander subassembly from vibration and motion of the compressor subassembly. This was particularly of interest when detectors in dewars mounted on the expander subassembly were isolated by a gimbaled mechanism from the compressor subassembly. This configuration provided a gimballing of the detector without introducing large, detrimental spring torques to the gimbal torque motors. This design permitted the compressor, which was large compared to the expander assembly, to be remotely located where available volume and heat rejection capability existed.

A natural evolution of this design was the relocation of the relatively heavy regenerator from the reciprocating displacer piston to the (stationary) cold cylinder. Thus, the displacer piston could be hollowed out making it much lighter than prior designs. This provided a reduction in the vibration output of the expander. Notwithstanding these refinements, Stirling cycle coolers continue to vibrate the associated mounting structure and, in particular, the detector assembly.

A conventional solution to this problem includes the provision of a small air gap between the cold tip of the expander and the dewar cold well to which the detector is mounted. However, this gap presents another problem: viz., how to transfer thermal energy from the detector to the cold finger of the expander. Currently two approaches are principally used in the art to interface a thermal load to a cold finger or cylinder.

One approach involves the mounting of the thermal load directly to the end of the cooler cylinder. This provides an excellent thermal interface and meets mechanical requirements. However, this approach results in an expensive integrated component with a combined cooler, sensor and dewar that cannot be easily repaired.

An alternative approach involves bonding an adapter to the cold finger with a conductive epoxy. Thermal grease is then used between the adapter and the surface to be cooled. During cooldown, thermal grease in the adapter-to-thermal load gap will freeze. As cooldown continues, differential thermal expansion of the cold finger, adapter, and dewar inner cylinder to which the thermal load is attached, causes the adapter to pull away from the dewar surface being cooled. The frozen thermal grease, acting as an adhesive, strains until it parts from the dewar surface. This may cause a spalling (removal of small fragments of material) of the metal or glass surface to be cooled. Over many cooldown cycles, debris is generated and the dewar structure of the metal or glass surface to be cooled may be compromised. In any event, the thermal interface becomes inadequate as the adapter is pulled farther from the surface to be cooled, creating a significant air gap.

Hence, a need remains in the art for an improved system or technique for interfacing the cooling surface of a cooling system to a thermal load. Particularly, there is a need in the art for a cooling surface which affords some degree of axial flexibility to compensate for differential coefficients of thermal expansion, mechanical tolerances, and other potential changes in relative location.

SUMMARY OF THE INVENTION

The need in the art is addressed by the cryogenic cooler and dewar assembly of the present invention. In a most general sense, the inventive cooler includes a cooled surface; a cooling surface for removing thermal energy from said cooled surface; and an adapter disposed between said cooling surface and the cooled surface for conducting thermal energy therebetween. In accordance with the present teachings, a first fluid is disposed between the cooled surface and the adapter for conducting thermal energy from the cooled surface to the adapter. A second fluid is disposed between the cooling surface and the adapter for conducting thermal energy from the adapter to the cooling surface whereby the cooling surface remains free to move axially relative to the adapter at a temperature of the cooling surface at which the first fluid is susceptible to freezing. This allows for movement of the cold finger relative to the dewar and adapter, due to differential thermal coefficients of expansion, and other structural requirements without adversely affecting the transport of thermal energy from the load.

In the illustrative embodiment, the cooler is a Stirling cycle cooler, the first fluid is thermal grease and the second fluid is gaseous nitrogen. The cooling surface is a cylindrical cold finger of the Stirling cycle cooler and the cooled surface is an inner wall of a dewar of the detector. The inner wall of the dewar is in thermal contact with a load. The adapter is disposed between the inner wall of the dewar and the cold finger. The adapter has an end cap and a cylindrical housing extending therefrom. The housing extends at least partially along a longitudinal axis of the cold finger. An insulator is disposed about the cold finger and the adapter housing. A spring is disposed between a proximal end of the insulator and a base of the cold finger to maintain a distal end of the insulator in contact with the adapter and the adapter in contact with the dewar.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
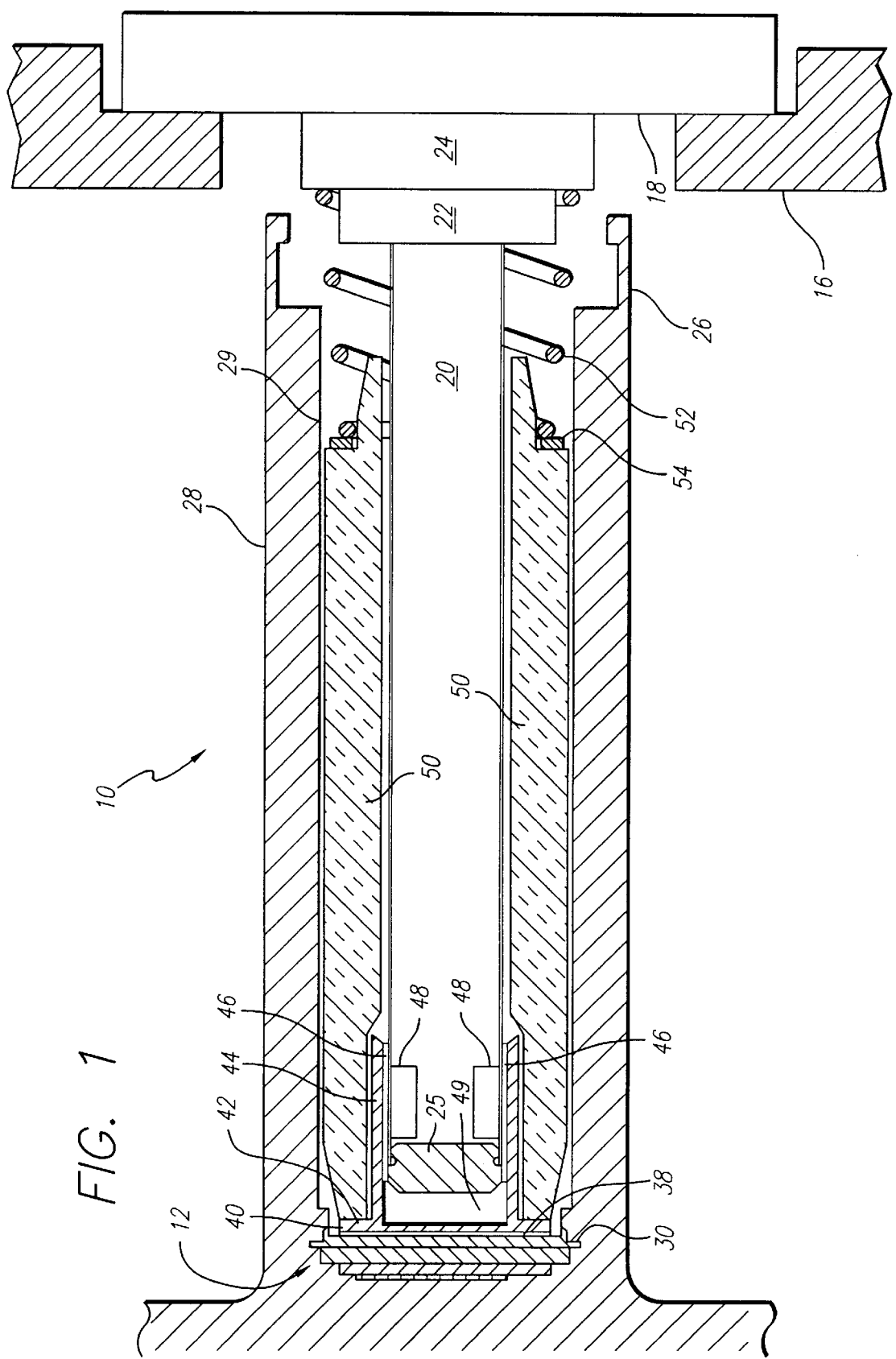
FIG. 1 is a sectional side view of an illustrative implementation of the Stirling cycle cryogenic cooler and dewar assembly of the present invention.

FIG. 1 is a sectional side view of an illustrative implementation of the Stirling cycle cryogenic cooler and dewar assembly of the present invention. The Stirling cooler and dewar assembly 10 is shown with a thermal load 12 attached thereto. In an illustrative missile application, the Stirling cryocooler expander 10 is mounted within a support structure such as a bulkhead 16. The bulkhead 16 may be made of aluminum or other suitable material. A cold finger 20 is secured into an expander flange 18. The expander flange and cold finger may be made of any suitable cryogenic material such as a nickel-based superalloy (e.g. Inconel 718) or stainless steel.

The proximal end of the cold finger 20 is seated in the expander flange 18 which includes a first annular shoulder 22 and a second annular should 24. The distal end of the cold finger 20 is slip fitted within an adapter 40 which is seated within a dewar 26. The dewar 26 may be made of stainless steel or other suitable material. The dewar 26 has an outer wall 28 and an inner titanium wall 29. The thermal load 12 is secured to the inner end cap 30 of the dewar 26.

Figure 2:
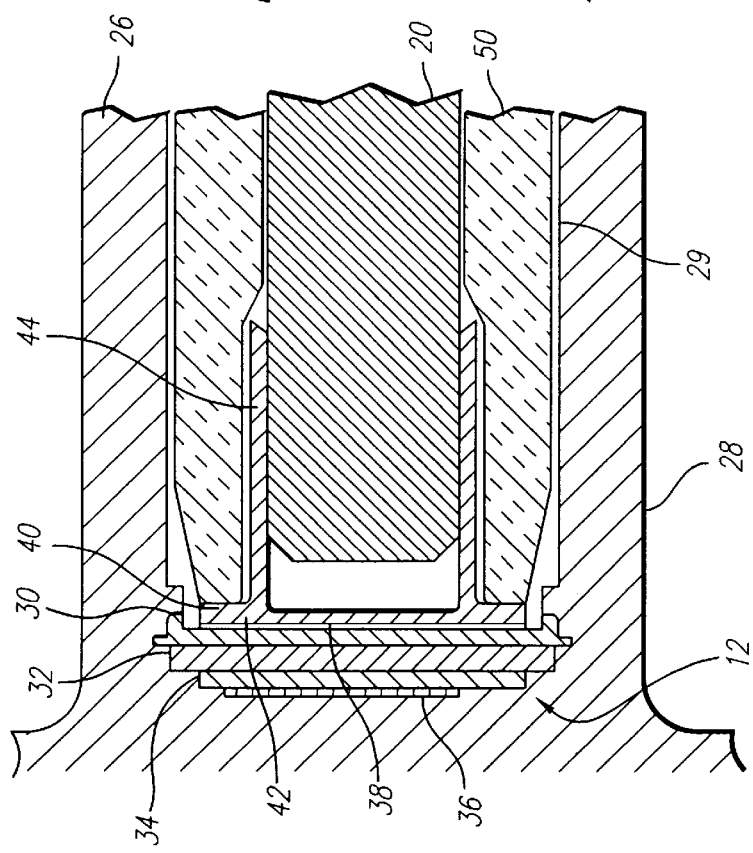
FIG. 2 is a magnified sectional view of the distal end of the cooler/dewar of FIG. 1.

FIG. 2 is a magnified view of the distal end of the cooler/dewar of FIG. 1. As shown in FIG. 2, the dewar 26 has an inner end cap 30 made of titanium or other suitable material to which the thermal load 12 is secured. The load 12 may be secured to the cap 30 by brazing or other suitable means. The load 12 includes a platform 32 made of a ceramic or other suitable material. Mounted on the platform 32 is a readout 34 made of silicon or other suitable material. A focal plane array of infrared detector elements 36 is secured to the readout 34.

To maintain the detector elements 36 at the liquid nitrogen temperatures required of many current missile applications, the thermal energy of the load must be effectively transferred from the load to the cold finger 20 of the expander flange 18. In accordance with conventional teachings, for effective thermal conduction, an adapter, such as the adapter 40 of FIGS. 1 and 2, is fitted in close proximity to the dewar end cap 30 via a thin layer of thermal grease 38 such as silver-filled silicone grease. The adapter 40 has an end cap 42 (shown vertical) from which a cylindrical housing 44 extends at least partially along the longitudinal axis of the cold finger 20. The adapter 40 has a chamfer to facilitate the assembly of the adapter onto the cold finger. The adapter 40 is preferably made of copper, silver or other material that provides good thermal conduction at the temperatures of interest for a given application.

In accordance with conventional teachings, thermal grease is also applied in the gap between the adapter and the cold finger. Unfortunately, at the extreme temperatures of liquid nitrogen, the grease has a tendency to freeze, bonding the adapter to the cold finger. As mentioned above, the adapter, cold finger, and other components are generally made of dissimilar materials and/or have dissimilar thermal masses, and a differential in the coefficient of thermal expansion exists therebetween. As a result, the cold finger tends to be much colder and therefor tends to contract relative to the other components. However, inasmuch as the adapter is frozen to the cold finger, contraction of the cold finger tends to pull the adapter away from the dewar end cap 30. Once the frozen grease releases from the dewar, this creates an air gap which acts as an insulator limiting thermal conduction from the detectors to the cold finger.

However, in accordance with the present teachings, the gap 46 (see FIG. 3) between the adapter 40 and the cold finger 20 is reduced (on the order of 0.0005 inches) and filled with nitrogen or other suitably thermally conductive gas. The nitrogen gas provides for good thermal conduction without susceptibility to freezing and allows for free axial movement of the cold finger 20 relative to the adapter 40. As a result, the temperature difference across the gap 46 will be minimal (e.g. $\Delta T=4°$ K.) and will remain minimal so long as the gap is maintained on the order of 0.001 inches (diametrical) or less. As a backup, if the temperature of the cold finger is reduced below the boiling point of nitrogen (77° K. at atmospheric pressure) liquid nitrogen forms in the gap, and the temperature difference is only 0.5° K. for a diametrical clearance of 0.001 inches because the liquid has a much higher thermal conductivity than the gas. Hence, mechanical piece part and assembly tolerances and differential thermal expansion are accommodated as the cold finger 20 slides within the adapter 40.

Figure 3:
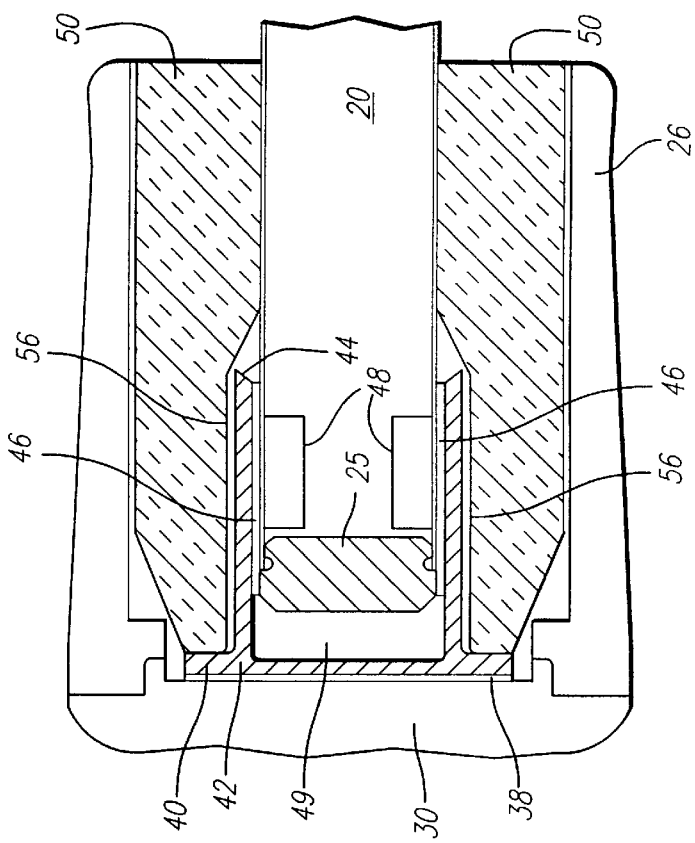
FIG. 3 is a further magnified sectional view of the proximal end of the cooler/dewar of FIG. 2.

FIG. 3 is a further magnified view of the proximal end of the cooler/dewar of FIG. 2. In accordance with the present invention, as shown in FIGS. 1–3, the adapter 40 is pressed against the end cap 30 of the dewar 26 by an annular insulator 50 under the influence of a coiled spring 52. The distal end of the insulator 50 is tapered and abuts against the end cap 42 of the adapter 40. The spring acts against a washer 54 fitted around a tapered proximal end of the insulator 50. The spring 52 is always in compression. The insulator 50 thus transmits an axial spring force to the adapter 40 ensuring good thermal contact while minimizing parasitic thermal loads. The insulator 50 and spring 52 hold the adapter 40 against the dewar end cap 30 when the grease in the gap therebetween is not frozen. The spring 52 rests against the second annular shoulder 24 of the expander flange 18 and, in the illustrative embodiment, provides 0.5 to 1 pound of spring force over its range of operating conditions and useful life. The natural frequency of the spring 52 should be well above anticipated operating frequencies of the operating environment.

The insulator 50 may be made of rigid polyurethane foam or other material suitable for cryogenic operation. Note that the insulator 50 has a recess 56 at the distal end thereof to fit over the adapter 40. The recess 56 has an inside diameter sufficiently large to avoid contact with the cylindrical portion of the adapter 40, thus minimizing parasitic heat load. The insulator 50 provides radial centering of the cold finger 20 within the bore of the dewar 26.

As illustrated in FIG. 3, the cylindrical housing 44 of the adapter 40 extends slightly beyond the 'heat-in' zone 48 of the cold finger 20. Hence, the adapter is long enough to accommodate the axial movement of the cold finger while maintaining a good thermal interface with the cold finger. (The 'heat-in' zone is the area of the cold finger over which thermal energy is removed.) A vented chamber 49 is provided between an end cap 25 of the cold finger 20 and the adapter 40. The chamber 49 provides clearance for relative motion. The chamber 49 is in communication with the gap 46 around the cold finger. Hence, nitrogen gas is allowed to flow into the chamber 49 to completely surround the cold finger 20.

Figure 4:
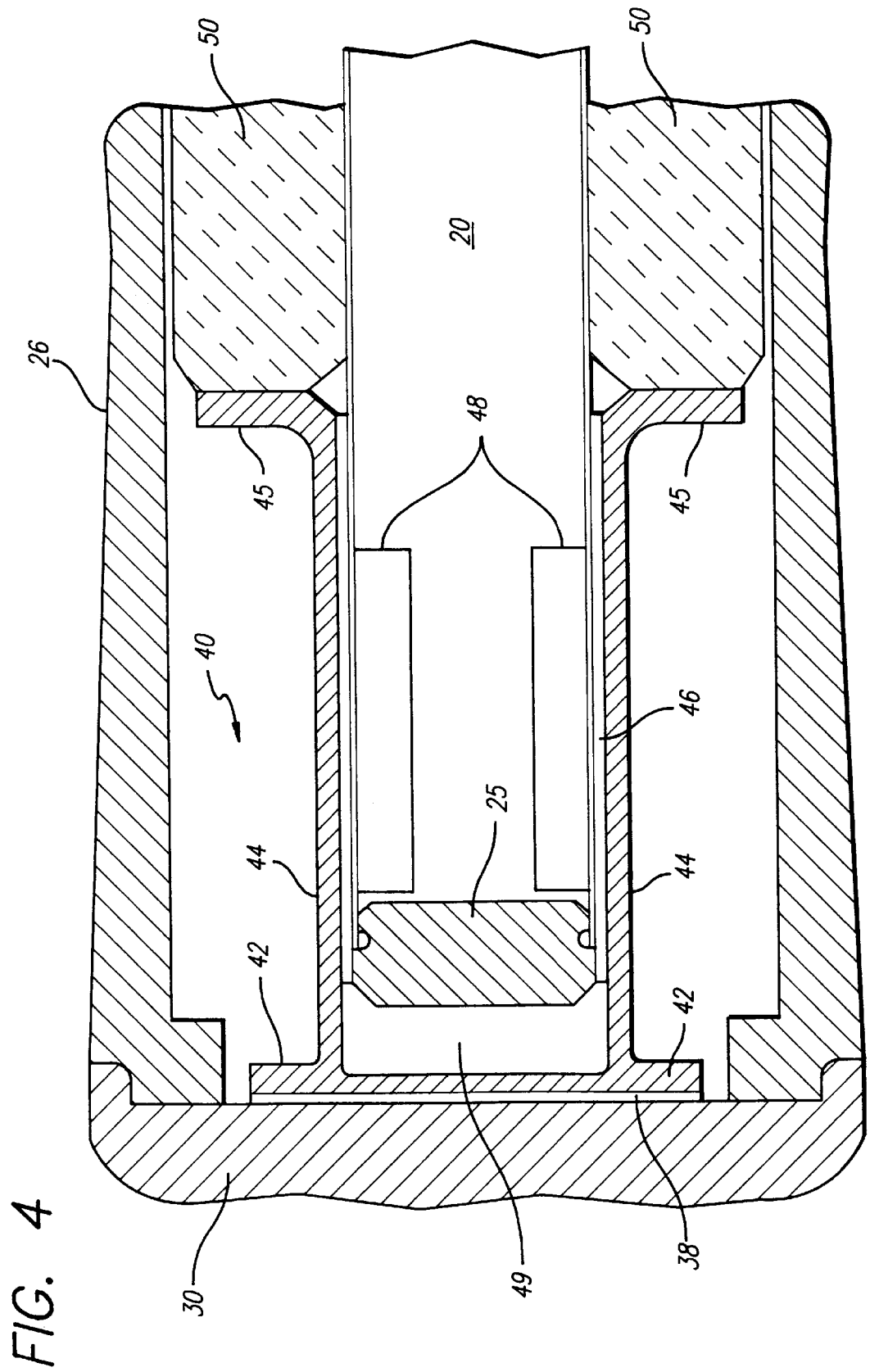
FIG. 4 is an alternative embodiment of the cooler/dewar of the present invention.

FIG. 4 is an alternative embodiment of the Stirling cycle cooler of the present invention. In FIG. 4, the tapered distal end of the insulator 50 and the recess 56 therein are eliminated. An annular flange 45 is provided on the adapter 40 against which the insulator 50 pushes. This embodiment provides a more secure pushing force against the adapter with a compromise in insulation and an increase in thermal mass (which increases cooldown time) at the distal end of the cold finger.

Thus, the present invention has been described herein with reference to a particular embodiment for a particular application. The invention affords a low temperature differential along the components utilized. In addition, the freedom of axial motion of the cold finger relative to the adapter of the present design substantially eliminates potential spalling and other mechanical stress induced damage of the cooled device due to differential thermal expansion between the cold finger and the dewar that are mechanically coupled with frozen thermally-conductive grease. The freedom of axial motion of the cold finger relative to the adapter accommodates structure length changes, typical of a missile with an aero-heated skin. Finally, the freedom of axial motion of the cold finger relative to the adapter afforded by the present invention substantially eliminates the need for assembly shims to accommodate assembly tolerance stackup.

Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A cryogenic cooler comprising:

a cooled surface;

a cooling surface for removing thermal energy from said cooled surface;

an adapter disposed between said cooling surface and said cooled surface for conducting thermal energy therebetween said adapter being mechanically decoupled from said cooling surface;

a first fluid disposed between said cooled surface and said adapter means for conducting thermal energy from said cooled surface to said adapter means; and a second fluid disposed between said cooling surface and said adapter means for conducting thermal energy from said adapter means to said cooling surface whereby said cooling surface remains free to move axially relative to said adapter means at a temperature of said cooling surface at which said first fluid is susceptible to freezing.

2. The invention of claim 1 wherein said first fluid is thermal grease.

3. The invention of claim 2 wherein said second fluid is nitrogen.

4. The invention of claim 1 wherein said second fluid is nitrogen.

5. The invention of claim 1 wherein said cooler is a Stirling cycle cooler.

6. The invention of claim 5 wherein said cooling surface is a cylindrical cold finger of said Stirling cycle cooler.

7. The invention of claim 6 wherein said cooled surface is an inner wall of a dewar assembly.

8. The invention of claim 7 wherein said adapter means includes an adapter disposed between said inner wall of said dewar and said cold finger.

9. The invention of claim 8 wherein said adapter has an end cap and a cylindrical housing extending therefrom, said housing extending at least partially along a longitudinal axis of said cold finger.

10. The invention of claim 9 wherein said first fluid includes thermal grease disposed between said end cap and said inner wall of said dewar.

11. The invention of claim 10 wherein said second fluid includes nitrogen disposed between said adapter housing and said cold finger.

12. The invention of claim 11 further including an insulator disposed about said cold finger and said adapter housing.

13. The invention of claim 12 further including spring means disposed between a proximal end of said insulator and a base of said cold finger whereby said spring is effective to maintain a distal end of said insulator in contact with said adapter and said adapter in contact with said dewar.

14. A Stirling cycle cryogenic cooler comprising:

a dewar in thermal communication with a load;

a cylindrical cold finger disposed within said dewar for removing thermal energy therefrom;

an adapter disposed between said dewar and said cold finger for conducting thermal energy therebetween, said adapter being mechanically decoupled from said cold finger;

thermal grease disposed between said dewar and said adapter for conducting thermal energy from said dewar to said adapter; and a gas disposed between said cold finger and said adapter for conducting thermal energy from said adapter to said cold finger whereby said cold finger remains free to move axially relative to said adapter at a temperature of said cold at which said grease is susceptible to freezing.

15. The invention of claim 14 wherein said gas is nitrogen.

16. The invention of claim 14 further including an insulator disposed between said cold finger and said dewar.

17. The invention of claim 16 further including spring means disposed between a proximal end of said insulator and a base of said cold finger whereby said spring is effective to maintain a distal end of said insulator in contact with said adapter and said adapter in contact with said dewar.

18. A cryogenic cooling method including the steps of:

providing a cooled surface;

providing a cooling surface for removing thermal energy from said cooled surface;

providing an adapter between said cooling surface and said cooled surface and conducting thermal energy therebetween, said adapter being mechanically decoupled from said cold finger;

providing a first fluid disposed between said cooled surface and said adapter means for conducting thermal energy from said cooled surface to said adapter means;

providing a second fluid between said cooling surface and said adapter; and conducting thermal energy from said adapter to said cooling surface whereby said cooling surface remains free to move axially relative to said adapter means at a temperature of said cooling surface at which said first fluid is susceptible to freezing.

* * * * *

UNITED STATES PATENT AND TRADEMARK OFFICE
CERTIFICATE OF CORRECTION

PATENT NO.    : 6,070,414
DATED         : June 6, 2000
INVENTOR(S)   : Bradley A. Ross and Robert M. Thompson, Jr.

It is certified that error appears in the above-identified patent and that said Letters Patent is hereby corrected as shown below:

Column 4,
Line 23, delete "second angular should 24" and insert -- second annular shoulder 24. --
Line 27, delete "an inner titanium wall 29." and insert -- an inner wall 29. --

Signed and Sealed this

First Day of October, 2002

Attest:

JAMES E. ROGAN
Attesting Officer     Director of the United States Patent and Trademark Office